J. F. ROGERS.
APPARATUS FOR MANUFACTURING ICE.
APPLICATION FILED DEC. 30, 1908.

954,467.

Patented Apr. 12, 1910.
2 SHEETS—SHEET 1.

Witnesses:
R. Hamilton
M. Cox

Inventor,
Judson F. Rogers,
By F. G. Fischer, atty.

J. F. ROGERS.
APPARATUS FOR MANUFACTURING ICE.
APPLICATION FILED DEC. 30, 1908.

954,467.

Patented Apr. 12, 1910.
2 SHEETS—SHEET 2.

Witnesses:
R. Hamilton
M. Cox

Inventor,
Judson F. Rogers
By F. G. Fischer, atty.

UNITED STATES PATENT OFFICE.

JUDSON F. ROGERS, OF HARRISONVILLE, MISSOURI.

APPARATUS FOR MANUFACTURING ICE.

954,467.   Specification of Letters Patent.   Patented Apr. 12, 1910.

Application filed December 30, 1908. Serial No. 469,974.

*To all whom it may concern:*

Be it known that I, JUDSON F. ROGERS, a citizen of the United States, residing at Harrisonville, in the county of Cass and State of Missouri, have invented certain new and useful Improvements in Apparatus for Manufacturing Ice, of which the following is a specification.

My invention relates to improvements in apparatus for the manufacture of ice by natural cold, and one of my objects is to produce a simple apparatus whereby ice can be produced in cakes of any desired size during freezing weather.

A further object is to arrange the congealing-tanks of the apparatus in such manner that the cakes of ice can be quickly removed therefrom.

With these and other objects in view, the invention may be said to consist in the novel construction, combination, and arrangement of parts hereinafter fully described, illustrated in the accompanying drawings, and pointed out in the claims appended hereto, it being understood that various changes in form, proportions, and minor details of construction may be resorted to without departing from the spirit, or sacrificing any of the advantages of the invention.

Figure 1:
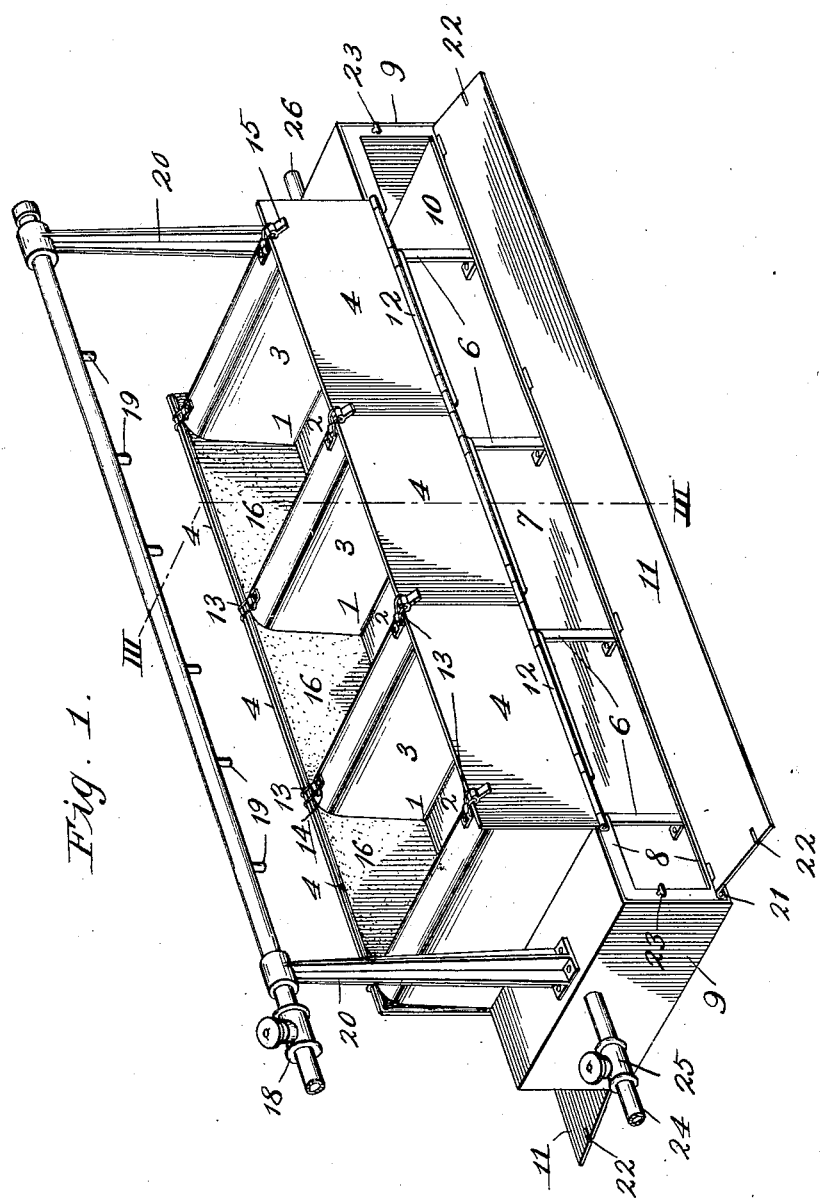
Figure 2:
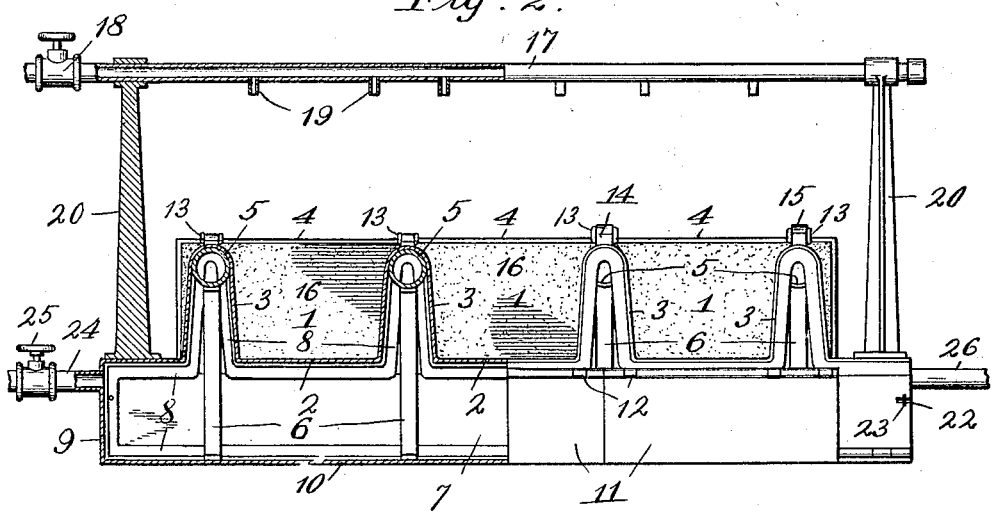
Figure 3:
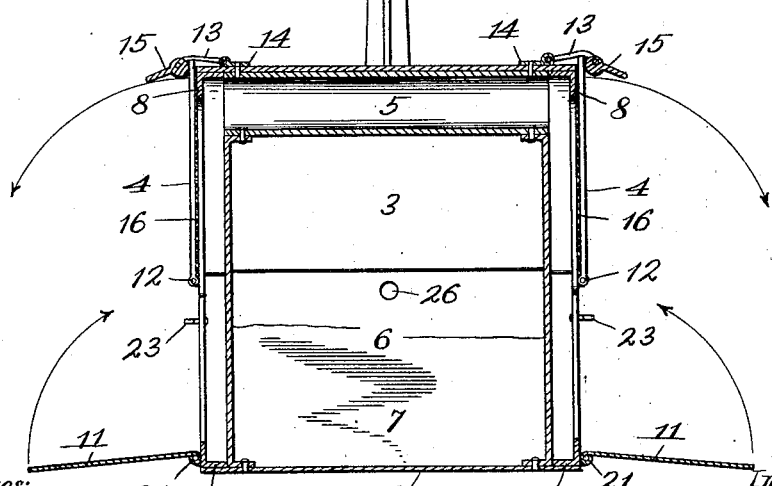

In the drawings, Figure 1 represents a perspective view of the apparatus in an operative position. Fig. 2 is a side elevation of the same partly in section. Fig. 3 is a cross section on line III—III of Fig. 1.

In carrying out the invention, I employ a plurality of congealing-tanks 1, constructed preferably of galvanized sheet-iron, and comprising bottom portions 2, chambered side walls 3, and hinged doors 4 for closing the ends of said tanks. The chambers of walls 3 are open the entire length of their bottom portions for the admission of the outer atmosphere. Walls 3 are strengthened at their upper curved portions by tubular reinforcements 5, and are supported by standards 6 resting upon the bottom portions of a convertible chamber 7, and secured at their upper ends to the reinforcements 5. Reinforcements 5 are open at their ends for communication with the chambers in walls 3, so that the cold air in said chambers may circulate freely through the reinforcements. Walls 3 are further reinforced at their ends with angle-irons 8, which also reinforce the bottoms 2 of the congealing tanks, and form part of the frame of the convertible chamber 7, which is inclosed by the bottoms 2 of the congealing-tanks, end walls 9, a bottom wall 10, and hinged doors 11.

Doors 4 of the congealing-tanks are secured by hinges 12 to the angle-irons 8 and extend slightly above the chambered walls 3 so that during the operation of filling the tanks, water may flow from one to the other in case one or more become filled before their companions. Doors 4 are locked in a closed position by clamps comprising links 13, pivotally secured to clips 14 on the tops of walls 3, and cam-levers 15 swiveled upon the links, each of said cam-levers being of sufficient width to engage two doors, as shown in Fig. 1, to avoid the necessity of providing two pairs of clamps for each door. The cam-levers 15 firmly press doors 4 against the ends of walls 3 to prevent the water in the tanks from leaking therefrom. I also take the additional precaution of inserting sheets of felt or heavy paper 16 between the doors and the walls, which not only prevent leakage from the tanks, but also prevent the ice from freezing to the doors and thus rendering it difficult to lower the same preparatory to removing the cakes of ice from the congealing-tanks.

Water is supplied to the congealing-tanks through a supply-pipe 17 provided with a valve 18, and a series of nozzles 19, through which latter the water is discharged into the tanks, a pair of said nozzles being preferably arranged above each tank, as shown in Fig. 2. Pipe 17 is supported by a pair of standards 20, resting upon the ends of the congealing-tanks.

Doors 11 of the convertible chamber 7 are secured to the angle-irons 8 by hinges 21 and have notches 22 at their ends for the reception of turn-buttons 23, pivotally mounted on the vertical ends of the angle-irons 8 for the purpose of locking doors 11 in a closed position.

24 designates a steam supply-pipe leading to one end of chamber 7, and provided with a valve 25, and 26 designates an exhaust-pipe leading from the opposite end of said chamber.

Having described the construction of the apparatus, I will now proceed to give a brief description of its operation: Doors 4 are firmly locked in a closed position by the cam-levers 15. Valve 18 is then opened so that water may flow through pipe 17 and the nozzles 19 into the congealing-tanks, which are filled to the desired depth after which the valve 18 is closed. Doors 11 are then opened so that cold air may enter the convertible chamber 7, and pass upward into the hollow walls 3, in order to insure an even temperature around the water in the tanks. After the water has become frozen into cakes, doors 11 are closed and steam or some other suitable heating agent is admitted through pipe 24 into chamber 7 for the purpose of loosening the cakes from the sides and bottoms of the congealing-tanks. Doors 4 are then opened so that the cakes of ice can be readily slid out through the sides of the congealing-tanks and thus avoid the necessity of lifting the cakes over the sides thereof.

Having thus described my invention, what I claim is:—

1. An apparatus of the character described, consisting of one or more congealing-tanks comprising bottom portions, chambered side walls, the bottom portions of the chambers being open their entire length, hinged doors for closing the ends of the congealing-tanks and the ends of the chambers in the side walls, and a convertible chamber beneath the tanks communicating with the chambers in the side walls.

2. An apparatus of the character described, consisting of one or more congealing-tanks comprising bottom portions, side walls, and hinged doors for closing the ends of said tanks, said doors extending above the tops of the side walls; and means on the tops of the side walls for locking said doors in a closed position and forcing them tightly against the ends of the side walls.

3. An apparatus of the character described, consisting of one or more congealing-tanks comprising bottom portions, chambered side walls, the bottom portions of the chambers being open their entire length, hinged doors for closing the ends of said tanks, and walls and doors beneath the tanks, forming a convertible chamber communicating with the chambers in the side walls.

4. An apparatus of the character described, consisting of one or more congealing-tanks comprising bottom portions, chambered side walls, hinged doors for closing the ends of said tanks, a valve-controlled water supply-pipe extending immediately over the tanks to supply the same with water, and means on the apparatus for supporting said supply-pipe.

5. An apparatus of the character described, consisting of one or more congealing-tanks comprising bottom portions, chambered side walls the bottom portions of the chambers being open their entire length, tubular reinforcements in the upper portions of the side walls, open at their ends and communicating with the chambers in said side walls, and hinged doors for closing the ends of said tanks; walls and doors beneath the tanks forming a convertible chamber communicating with the chambers in the side walls, standards resting on the bottom of the chamber and secured to the reinforcements in the chambered walls, means for discharging a heating agent into said convertible chamber, and means for exhausting the heating agent from said chamber.

In testimony whereof I affix my signature, in the presence of two witnesses.

JUDSON F. ROGERS.

Witnesses:
 JOHN H. WILSON,
 KEE F. ROGERS.